(12) United States Patent
Agassy et al.

(10) Patent No.: US 8,392,431 B1
(45) Date of Patent: Mar. 5, 2013

(54) SYSTEM, METHOD, AND COMPUTER PROGRAM FOR DETERMINING A LEVEL OF IMPORTANCE OF AN ENTITY

(75) Inventors: Oren Agassy, Lavon (IL); Amit Braytenbaum, Jaffa (IL)

(73) Assignee: Amdocs Software Systems Limited, Dublin (IE)

( * ) Notice: Subject to any disclaimer, the term of this patent is extended or adjusted under 35 U.S.C. 154(b) by 295 days.

(21) Appl. No.: 12/755,979

(22) Filed: Apr. 7, 2010

(51) Int. Cl.
*G06F 17/30* (2006.01)
(52) U.S. Cl. ........................................... 707/748
(58) Field of Classification Search ................... 707/748
See application file for complete search history.

(56) References Cited

U.S. PATENT DOCUMENTS

| | | | |
|---|---|---|---|
| 7,827,241 B2* | 11/2010 | Faus et al. | 709/204 |
| 8,255,403 B2* | 8/2012 | Kenedy et al. | 707/748 |
| 8,260,789 B2* | 9/2012 | Dumais et al. | 707/748 |
| 2007/0121843 A1* | 5/2007 | Atazky et al. | 379/114.13 |
| 2008/0212899 A1* | 9/2008 | Gokturk et al. | 382/305 |
| 2010/0169262 A1* | 7/2010 | Kenedy et al. | 707/E17.108 |
| 2010/0185509 A1* | 7/2010 | Higgins et al. | 705/14.49 |
| 2010/0299324 A1* | 11/2010 | Truv et al. | 707/725 |
| 2011/0093450 A1* | 4/2011 | Berkovits et al. | 707/710 |
| 2011/0153423 A1* | 6/2011 | Elvekrog et al. | 705/14.53 |
| 2011/0161987 A1* | 6/2011 | Huang et al. | 709/206 |
| 2011/0196855 A1* | 8/2011 | Wable et al. | 707/711 |

OTHER PUBLICATIONS

Specification of Provisional U.S. Appl. No. 61/303,215 "Social Networking application using posts to determine compatibility" dated Feb. 10, 2010, by Richard Vance, 8 pages.*
Drawings of Provisional U.S. Appl. No. 61/303,215 "Social Networking application using posts to determine compatibility" dated Feb. 10, 2010, by Richard Vance, 6 pages.*

* cited by examiner

*Primary Examiner* — Wilson Lee
*Assistant Examiner* — Tiffany Thuy Bui
(74) *Attorney, Agent, or Firm* — Zilka-Kotab, PC (57) ABSTRACT

A system, method, and computer program product are provided for determining a level of importance of an entity. In use, an identifier of an entity is identified. Additionally, at least one source publishing entity information is searched for the identifier to determine at least one source publishing information associated with the entity. Further, the information associated with the entity is identified from the at least one source publishing the information associated with the entity. Still yet, the information is scored utilizing at least one predefined algorithm to generate at least one score, each score generated for a different one of the at least one predefined algorithm. Moreover, a value indicative of a level of importance of the entity is calculated, utilizing the at least one score.

18 Claims, 9 Drawing Sheets

SYSTEM, METHOD, AND COMPUTER PROGRAM FOR DETERMINING A LEVEL OF IMPORTANCE OF AN ENTITY

FIELD OF THE INVENTION

The present invention relates to profiles, and more particularly to identifying descriptive data associated with entities.

BACKGROUND

Profiles have become increasingly utilized to identify characteristics of entities for various purposes. For example, the profiles have oftentimes been utilized for determining marketing information, offers, etc. that are targeted to the entities (e.g. based on the characteristics of the entity). Unfortunately, the entity characteristics conventionally identified for inclusion in these profiles have been limited. Just by way of example, the entity characteristics in a profile oftentimes include a numerous amount of information simply gathered for an entity from various sources, without necessarily including any particular meaning to the information.

There is thus a need for addressing these and/or other issues associated with the prior art.

SUMMARY

A system, method, and computer program product are provided for determining a level of importance of an entity. In use, an identifier of an entity is identified. Additionally, at least one source publishing entity information is searched for the identifier to determine at least one source publishing information associated with the entity. Further, the information associated with the entity is identified from the at least one source publishing the information associated with the entity. Still yet, the information is scored utilizing at least one predefined algorithm to generate at least one score, each score generated for a different one of the at least one predefined algorithm. Moreover, a value indicative of a level of importance of the entity is calculated, utilizing the at least one score.

DETAILED DESCRIPTION

Figure 1:
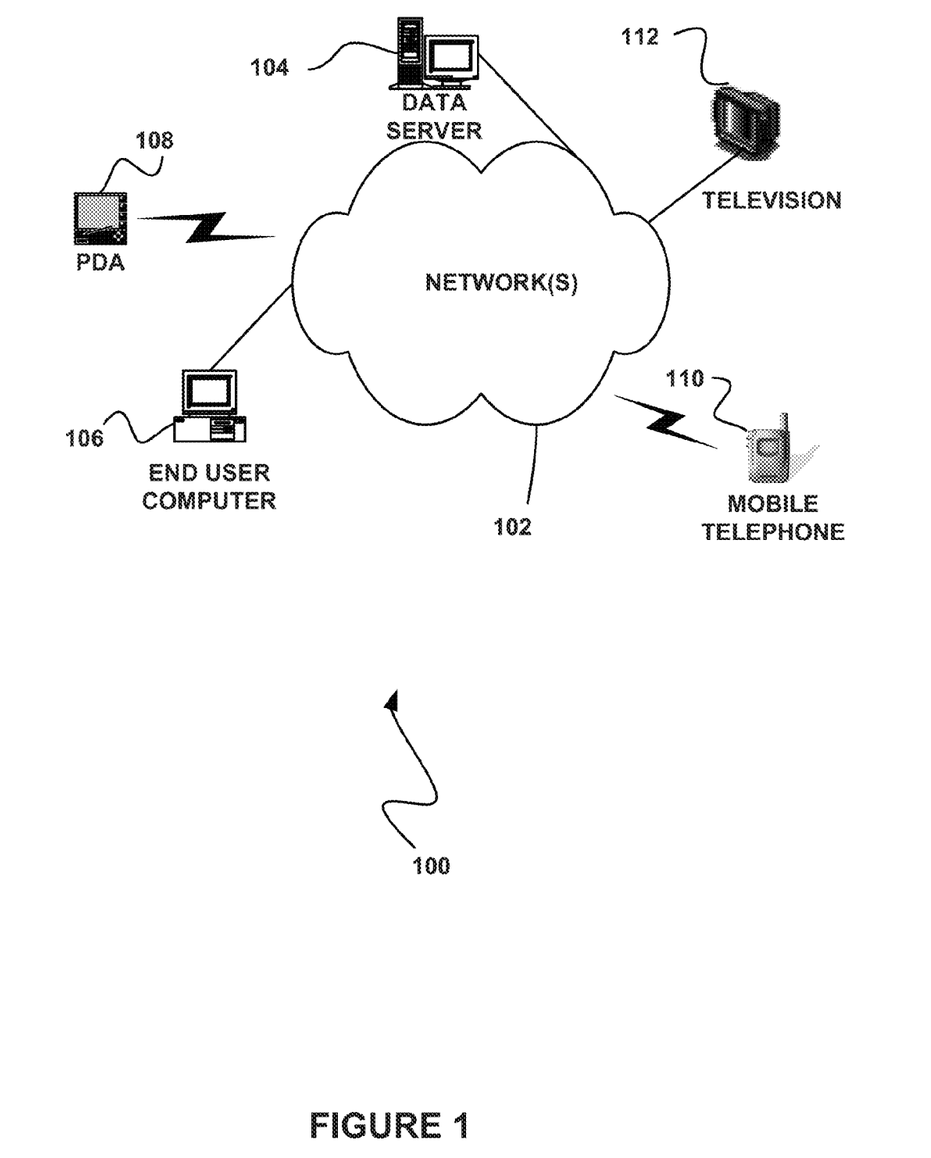
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
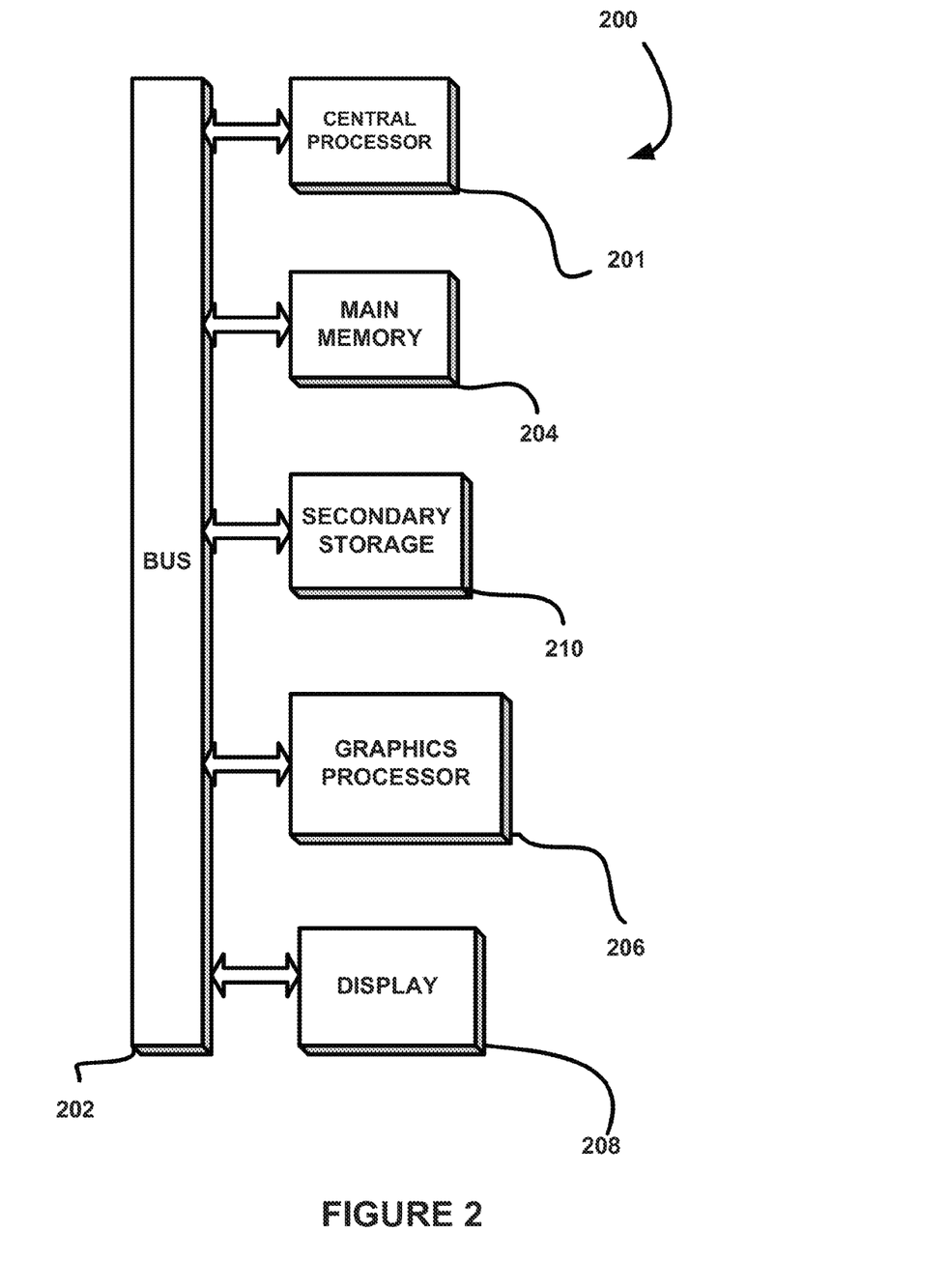
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
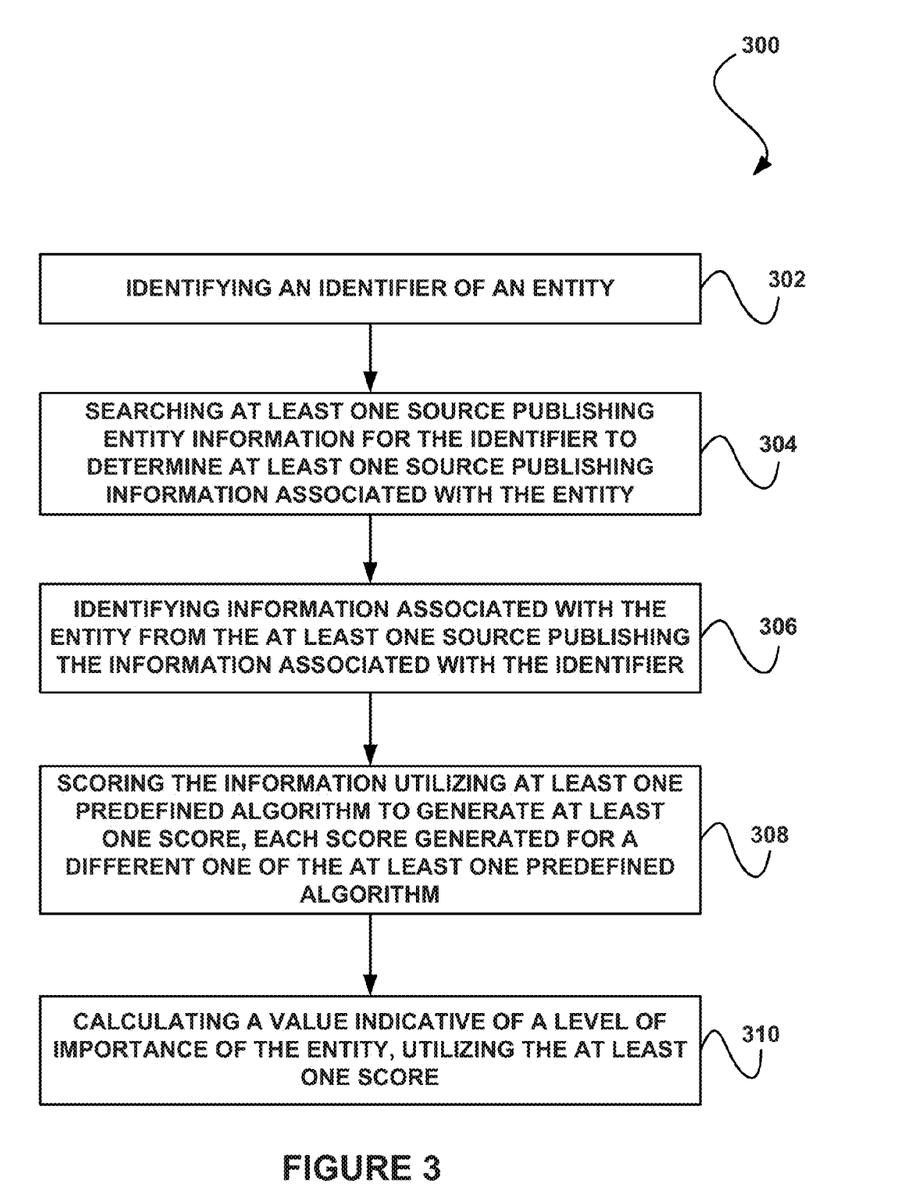
FIG. 3 illustrates a method for determining a level of importance of an entity, in accordance with one embodiment.

FIG. 3 illustrates a method 300 for determining a level of importance of an entity, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an identifier of an entity is identified. With respect to the present description, the entity may include any person, organization, company, etc. for which information may be published. For example, the entity may include a person for which information associated with the person is presented on a website.

To this end, the identifier of the entity may include any identifier that identifies a characteristic of the entity. In one embodiment, the identifier of the entity may include a name (e.g. first and last name) of the entity. In another embodiment, the identifier of the entity may include an email address of the entity. Of course, while only a single identifier is described, it should be noted that any number of identifiers of the entity may be identified as utilized in the manner described below.

Further, the identifier of the entity may be identified from a profile of the entity. Optionally, various characteristics of the entity may be stored in the profile of the entity in association with the identifier of the entity. Of course, however, the identifier of the entity may be identified from any data (e.g. list, etc.) including the identifier of the entity.

Additionally, as shown in operation 304, at least one source publishing entity information is searched for the identifier to determine at least one source publishing information associated with the entity. It should be noted that the source publishing entity information may include any data source by which information associated with at least one entity is either directly published (e.g. presented, displayed, etc.) or indirectly published (e.g. as capable of being determined from the directly published information). In various embodiments, the source publishing entity information may include a website providing a social networking service [e.g. Twitter™, Facebook™, LinkedIn™, or any other open application on the Internet that allows entities to communicate and exchange any piece of information (according to the network function, where social connections are either created explicitly by the users or automatically by the networks using matching logics or by using the type of use, such as interest or geographical location), or closed/private application where approval from the entity to use the information associated with the entity that is retrieved from the publishing entity], an informational website providing documentation on various subject matter (e.g. Wikipedia, etc.), an information website providing documentation on a particular subject matter (e.g. imdb.com, NBA.com, NLB.com, etc.), websites for indexing and/or referencing information associated with entities (e.g. people-.forbes.com), a search engine website providing search results in response to searches for data, private reference sources, etc.

In addition, the source(s) publishing entity information that are searched may include a predetermined set of sources. In one embodiment, at least one source publishing entity information may be predetermined (e.g. from a list of available sources publishing entity information) for a particular manner in which the output of the method 300 (i.e. a type of use of a calculated level of importance of the entity, as described in operation 310) is to be utilized. For example, a first set of sources may be predetermined for use in calculating a level of importance of the entity with respect to mobile devices, whereas a different second set of sources may be predetermined for use in calculating a level of importance of the entity with respect to the entity's involvement in a sport.

In one embodiment, the source publishing entity information may be searched for the identifier by querying such source for the identifier. Optionally, a search tool provided by the source publishing entity information may be utilized to search for the identifier of the entity. As another option, a search engine may be utilized to perform the search for searching all of the aforementioned sources publishing entity information via a single search. Of course, however, the source publishing entity information may be searched in any desired manner that determines whether such source publishes information in association with the identifier of the entity.

In another embodiment, the source publishing information associated with the entity may be determined from a result of the search (e.g. a result of the aforementioned query). For example, the result of the search may indicate whether a particular source publishing entity information for which the search was performed has published the identifier of the entity utilized to perform the search (or information associated with such identifier). As another example, the result of the search may indicate which sources publishing information for which the search was performed have published the identifier of the entity utilized to perform the search (or information associated with such identifier). If it is determined that the source publishing entity information for which the search was performed has published the identifier of the entity utilized to perform the search (or information associated with the identifier), such source may be automatically determined to be a source publishing information associated with the entity.

Further, the information associated with the entity is identified from the at least one source publishing the information associated with the entity, as shown in operation 306. For example, information associated with the entity may be identified from each source determined to be publishing the information associated with the entity. Thus, information associated with the entity may optionally be identified from a plurality of sources publishing information associated with the entity.

Moreover, it should be noted that the information associated with the entity may be identified from the source publishing the information associated with the entity in any desired manner. In one embodiment, the information associated with the entity may be identified based on a relevancy of the information to a publication of the identifier of the entity by the source publishing the information associated with the entity (e.g. a location of the information with respect to the published identifier, etc.). Just by way of example, the information may be identified from a webpage that is personalized for the particular identifier of the entity (e.g. a social networking webpage personalized for the entity). In other embodiments, the information may be identified by directly retrieving the information from the source publishing the information or by determining the information from other information published by the source (e.g. such as determining a rate of information published by the source, as described below, etc.)

Furthermore, the information associated with the entity that is identified may optionally include any information associated with the entity that is published by the source. As another option, the information associated with the entity that is identified may include predetermined types of information associated with the entity that is published by the source. The predetermined types may be configured by the administrator that performed the aforementioned search, for example.

In various embodiments, the information may be associated with celebrity, social media presence, traditional media influence, political influence, key events/conferences with visiting celebrities and media, executive position, major supplier or client to key clients, social and traditional media presence or influence (different channels), suppliers and partners, telecom administrators and decision makers, executive family and calling circle, key events/conferences with visiting dignitaries, executives, politicos, etc.

For example, in one embodiment, the information may include a number of followers of the entity (e.g. a number of ties or connections the entity has with other entities, for example, as established via a social network service provided by the source publishing information associated with the entity). The followers may be for the entity (for example on Facebook™), the entity's content publications (for example on Twitter™), or the entity's interests (for example on Delicious™). In another embodiment, the information may include a rate between a number of other entities the entity is following and a number of other entities following the entity.

In yet another embodiment, the information may include a level of importance of the friends of the entity described above (e.g. where such level of importance for each of the friends of the entity is calculated in the manner described with respect to the present method 300 of for the entity). In still yet another embodiment, the information may include a group affiliations held by the entity. In a further embodiment, the information may include an average time other entities respond to a publication by the entity.

In another embodiment, the information may include a number of tags associated with the entity, such as video tags, picture tags, blog entry tags, micro blog mentions (e.g. a number on Twitter™), and/or any other social tags created from a social tagging tool.

In an additional embodiment, the information may include a rate of activity of the entity, such as a rate of a level of activity of the entity (e.g. a latest activity time, a number of status updates, a number of new bookmarks, a number of uploaded pictures, a number of questions answered, etc.). It should be noted that each different type of activity for which the rate is determined may be measured over different predetermined periods of time.

In another embodiment, the information may include a number of comments on the activities of the entity (e.g. comments on a status update published by the entity in Twitter™, a picture uploaded to Flickr™, etc.). In still yet another embodiment, the information may include interests of the entity. Such interests may be identified based on a group to which the entity belongs, another entity being followed by the entity, another entity under which the entity is employed, other entities to which the entity has established a connection (e.g. via a social network) and the third party entities that are followed by such other entities, etc.

In a further embodiment, the information may include a response by the entity to a social networking campaign, offers, etc. For example, the information may include a number of transactions performed by the entity following an advertisement, offer or campaign over a social network, without necessarily any limitation on the channel via which the transaction was performed [e.g. such as where the entity receives an offer over Twitter™ but completes the transaction associated with the offer over a short message service (SMS)]. As another example, the information may include a number of messages received from the entity to an enterprise presence on the social network. In yet another example, the information may include a rate between received and sent messages with respect to an enterprise and the entity. In another embodiment, the information may include a response by the entity to another entity's presence in a social networking environment.

In yet another embodiment, the information may include purchasing information associated with the entity. For example, the information may include a number of purchases made by the entity through a company initiating the identification of the information (e.g. via a social network or other channels associated with the company). As another example, the information may include a number of notifications/recommendations made by the entity to the entity's contacts through company's channel. As yet another example, the information may include a number of reverse recommendations/feedback made by the entity to his contacts through company's channel. In an additional embodiment, the information may include family information. For example, the information may indicate a family role of the entity (e.g. wife, husband, brother, etc.), family roles of members of the entity's family, employers of the members of the entity's family, etc.

In another embodiment, the information may include an indication of an appearance (e.g. reference, etc.) of the entity in an informational (e.g. subject matter) website, such as whether the entity has a webpage in a particular website (e.g. tv.com, NBA.com, etc.), whether such webpage is crossed referenced by other information websites (e.g. Wikipedia™, imdb.com, etc.). In yet another optional embodiment, the information may include an indication of whether the entity is a celebrity (e.g. media celebrity). Such an indication may be identified based on whether content of a webpage about the entity indicates the entity is a celebrity (e.g. whether a Wikipedia™ page describing the entity identifies the entity has a host of a television show or a winner of a reality television show). As another option, the indication may be based on a determination of whether the entity is important in at least one particular aspect of the entity's life. For example, the indication may be determined based on the entity's place of work (e.g. if the entity if working for NBC™), a rank or role of the entity in the entity's place of work (e.g. if the entity is a producer), etc. As other options, the indication may be based on whether the entity is referenced in a celebrity indexing website (e.g. http://whocelebstweet.com/) and/or whether the entity is directly related to another entity with high media exposure (e.g. whether the entity is a host of a successful television show where the television show has an appearance in the social network but the host does not necessarily have such an appearance).

In still yet another embodiment, the information may include business information associated with the entity. Such business information may be identified from a published profile associated with the entity. For example, the business information may include a place of employment of the entity, a rank or role of the entity's employment, a business related group to which the entity belongs, etc.

In a further embodiment, the information may include a number of references made to the entity, such as in a blog entry, microblog entry, etc. In another embodiment, the information may include a published profile of the entity. In yet another embodiment, the information may include a number of positive feedbacks given to activity of the entity (e.g. in Blogger™). In an additional embodiment, the information may include a number of results returned for a search of the entity performed utilizing a search engine (e.g. Google™, Bing™, etc.).

Still yet, the information is scored utilizing at least one predefined algorithm to generate at least one score, where each score is generated for a different one of the at least one predefined algorithm. Note operation 308. With respect to the present description, the predefined algorithm may include any test, conditional statement, method, etc. utilized for scoring the information to generate a score. Further, each predefined algorithm may be associated with a different type (e.g. piece, source, parameter, etc.) of information identified in operation 304, such that each predefined algorithm may be utilized to score to the information associated therewith.

In addition, the predefined algorithm may be predefined for scoring the information based on the particular manner in which the output of the method 300 (i.e. a type of use of a calculated level of importance of the entity, as described in operation 310) is to be utilized (e.g. as described above). Thus, different algorithms may be predefined for scoring information based on the particular manner in which the output of the method 300 is to be utilized. In one embodiment, a default set of predefined algorithms (e.g. all available predefined algorithms) may be utilized when a general (e.g. all-purpose) level of importance of the entity is to be calculated. In another embodiment, a subset (e.g. customized set) of all available predefined algorithms may be utilized when a level of importance of the entity is to be calculated with respect to a specific subject matter (e.g. sports, games, etc.)

It should be noted that the score generated by the predefined algorithm may include a number or any other value capable of being utilized to calculate a value indicative of a level of importance of the entity, as described below with respect to operation 310. As an option, each score may indicate a level of importance of the entity (e.g. influence over other entities, etc.) with respect to the information based on which the score is generated. As another option, where the information is a number (e.g. a number of followers of the entity, a number of tags associated with the entity, etc.), the score may be equal to the number. As another option, a predefined algorithm may generate a score based on a score generated from another predefined algorithm (e.g. by taking as input the score generated from the other predefined algorithm).

In one embodiment, the score generated based on the number of followers of the entity may increase as a function of the number of followers. For example, the score may increase as the number of followers increases (e.g. thus indicating that the level of influence that the entity has over other entities increases as the number of followers of such entity increases).

In another embodiment, the score generated based on the level of importance of the friends of the entity may increase as a function of the level of importance of the friends of the entity. For example, the score may increase as the level of importance of the friends of the entity increases. Optionally, the score may even further increase if the friends are followers of the entity.

In yet another embodiment, the score generated based on group affiliations held by the entity may increase as a function of the group affiliations held by the entity corresponding to a campaign to be sent to the entity based on the level of importance of the entity described below in operation 310. For example, the score may be calculated based on whether the entity belongs to a group relevant to the campaign (e.g. the score of the entity may increase for a sport campaign if the entity belongs to at least one group associated with a sports team).

In a further embodiment, the score generated based on the average time other entities respond to a publication by the entity may increase as a function of the average time other entities respond to a publication by the entity. For example, as the average time other entities respond to a publication by the entity increases, the score may increase. In still yet another embodiment, the score generated based on the number of tags associated with the entity may increase as a function of the number of tags associated with the entity. For example, the score may increase as the number of tags in which the entity appears increases. The score may optionally also be based on whether such tags were generated by the entity or by other entities, for example, such that tags generated by the entity may result in less of an increase of the score than tags generated by other entities.

In an additional embodiment, the score generated based on interests of the entity may increase as a function of a relevance of the interests of the entity to area (e.g. category, etc.) associated with an entity that initiated the identification of the information for ultimately determining the level of importance of the entity (as described in operation 310). Just by way of example, if the entity that initiated the identification of the information is a communications service provider, the score may be increased as a function of the entity belonging to a group associated with mobile devices or mobile applications.

In yet another embodiment, the score generated based on purchasing information associated with the entity may indicate a purchasing power of the entity. In still yet another embodiment, the score generated based on family information associated with the entity may be a function of the family information. Optionally, the role of the entity in the entity's family may be associated with a predetermined level of influence, such that the score may be increased as a function of the level of influence associated with the role of the entity in the entity's family. For example, the score may increase for an entity who is a wife of a chief executive officer (CEO) of a particular company, where information on such company is desired to be sent to the entity an entity that initiated the identification of the information for ultimately determining the level of importance of the entity (as described in operation 310).

In still yet another embodiment, the score generated based on an indication of whether the entity is a celebrity or other important entity may be a function of the place of work of the entity and/or the rank or role of the entity in the entity's place of work. For example, the score may be increased in response to determination that the entity is employed by a television broadcasting station (e.g. NBC™) and is a producer at such television broadcasting station. In another embodiment, the score generated based on business information associated with the entity, the score may be increased as a function of a place of employment of the entity, a rank or role of the entity at the entity's place of employment, and/or a business related group to which the entity belongs. Just by way of example, the score may be increased for an entity that is employed by a fortune 500 company, that is a vice president or CEO (or other executive), that is an ivy league school alumni, etc.

As an option, each predefined algorithm may be assigned a weight. For example, the weight may be assigned by an entity that initiated the identification of the information (in operation 304) for determining a level of importance of the entity. In this way, predefined algorithms each associated with a different type of information may be weighted in a customized manner according to the importance of the information to be scored by such predefined algorithms in determining the level of importance of the entity. As another option, each predefined algorithm may be assigned a weight per segment of information for which a score is generated utilizing the predefined algorithm. For example, the segments may include geographic locations, line of business, interests, age, etc. The score generated for a predefined algorithm may therefore optionally be weighted based on the weight assigned to the predefined algorithm, for generating a weighted score.

As yet another option, the predefined algorithm may be assigned a priority. In this way, when a plurality of predefined algorithms are to be utilized for scoring the information associated with the entity, the scores may be generated based on the priority of the predefined algorithms. Further, each predefined algorithm may be associated with a predetermined threshold, such that if the score generated utilizing one of the predefined algorithms does not meet the threshold, the remaining predefined algorithms of lower priority may be prevented from being utilized to score the information (and the method 300 terminated). Such thresholds may be utilized identify entities determined to not meet a requisite level of importance as determined by a predetermined algorithm with an associated threshold, and to filter out such entities from having a level of importance calculated based on scores generated from the predefined algorithms.

Table 1 illustrates numerous examples of the sources that may be searched for the identifier of the entity (e.g. as described in operation 304), the information associated with the entity that may be identified from such sources that are determined to publish information associated with the entity (e.g. as described in operation 306), and the thresholds based on which such information may be scored (e.g. as described in operation 308). Of course, it should be noted that the information presented in Table 1 is set forth for illustrative purposes only, and thus should not be construed as limiting in any manner.

TABLE 1

Go to the following sites and look for the entity a. Facebook ™
  i. Are there groups or fan pages dealing with this entity's name?
  ii. How many? (threshold)
  iii. How many people are following them? (threshold)
b. Twitter ™
  i. Can you identify Twitter ™ user/s with the entity's name?
  ii. How many?
  iii. How many people are following them? (threshold)
c. Wikipedia ™
  i. Is there is an entry to this entity's name?
  ii. Is he important?
d. Google ™ and Bing ™
  i. How many results do you get for this entity's name? (threshold)
e. Business validation
  i. Can this entity be found in LinkedIn ™? Can this entity be found in people.forbes.com?
  ii. Score the entity (forbes.com ™, LinkedIn ™ profile "as-is" may not be good enough for defining importance) (Threshold)
f. Go to known indexes and private reference sites and look for the entity.

Moreover, as shown in operation 310, a value indicative of a level of importance of the entity is calculated, utilizing the at least one score. With respect to the present description, the level of importance may include any level on a predetermined scale that indicates the importance (e.g. influence, etc.) of the entity (e.g. with respect to another entity that initiated the method 300, with respect to other entities influenced by the entity). For example, the level of importance may indicate the importance of the entity to the other entity's business objectives, marketing campaigns, etc.

Thus, the value indicative of the level of importance of the entity may optionally be a value on the aforementioned predetermined scale. In addition, the value may include a single indicator of the level of importance of the entity, such that the single indicator (and not necessarily the specific information identified in operation 304) may be utilized by the other entity that initiated the method 300 for any desired purpose. In one embodiment, at least some of the scores (or optionally weighted scores) generated from the predefined algorithms may be summed to form the value. For example, the scores not necessarily utilized for generating another one of the scores, as described above, may be summed to calculate the value. In this way, the scores may be utilized to calculate the value indirectly (by being utilized to generate another one of the scores) or directly (by being utilized in a calculation with other scores to generate the value indicative of the level of importance of the entity.

In another embodiment, the scores (or optionally weighted scores) generated from the predefined algorithms may be summed (or otherwise combined) to form a result from which the value may be derived. For example, where the value is selected from "low importance", "medium importance", "high importance", or "very high importance", each such selection may be associated with a different range of numbers (or other values). Thus, in such example, the range of numbers in which the result of the calculation exists may be identified and the value associated therewith determined to be indicative of the level of importance of the entity.

Furthermore, because the value indicative of the level of importance is calculated utilizing the at least one score, the level of importance determined for the entity may be based on the predefined algorithms utilized to generate such score(s). For example, as noted above, the predefined algorithms may include a default set of algorithms, such that the level of importance may be generic for the entity (e.g. calculated without respect to a particular subject matter), whereas in another embodiment the predefined algorithms may include a subset (e.g. customized set) of all available predefined algorithms that are associated with a particular subject matter, such that the level of importance may be specific to such subject matter. Thus, different levels of importance may be calculated for the entity for different subject matters, as an option.

As noted above, the level of importance may indicate the importance of the entity to the another entity's business objectives, marketing campaigns, etc. To this end, the level of importance may be utilized by the entity initiating the method 300 (hereinafter initiating entity), which may be a company, service provider, etc., to determine offers, advertisements, campaigns, etc. to be sent to the entity, to update a profile of the entity, etc. For example, entities determined to be of "high importance" (e.g. real media celebrities, high ranking executives, social influencers) may be treated by the initiating entity differently than entities determined to be of "low importance."

As another example, personalization for the entity may be provided in a manner that is based on the level of importance of the entity with respect to a specific subject matter, as indicated by the calculated value. In one exemplary embodiment, an entity that calls into a call center may be provided with a particular proposal (e.g. offer, etc.) based on the level of importance generated for the entity with respect to the proposal.

As yet another example, a social average revenue per user (ARPU) may be determined based on the entity's level of influence and the ARPU of the entity's followers for influencing the entity a function of the entity's social ARPU. As still yet another example, marketing access methods may be optimized according to the level of importance of the entity (as related to the social role of the entity). Further, a unified social role and rate may be provided across the various types of media, based on the level of importance of the entity. To this end, the method 300 may be utilized by customer relationship management (CRM), responsible information management (RIM), self service, campaign management, etc.

Table 2 illustrates one example of a calculation of a value indicative of a level of importance of an entity based on scores generated utilizing a plurality of predefined algorithms applied to information associated with the entity that is identified from Twitter™. It should be noted that the exemplary calculation shown in Table 2 is set forth for illustrative purposes only, and thus should not be construed as limiting in any manner.

TABLE 2

The initiating entity inserts the weights of the predefined algorithms as a number between 0 to 10, where zero is for a predefined algorithm the initiating entity wishes not to consider, and 10 is for the most important predefined algorithm.

| | |
|---|---|
| Parameter #1 Score = If max_parameter!=0 | If any of my friends have value in this parameter |

TABLE 2-continued

The initiating entity inserts the weights of the predefined algorithms as a number between 0 to 10, where zero is for a predefined algorithm the initiating entity wishes not to consider, and 10 is for the most important predefined algorithm.

| | | |
|---|---|---|
| (client's parameter value/ max_parameter)* (parameter_w eight/sum of all weights). | Calculate the proportional part of this parameter for a specific friend | |
| Else | | |
| (parameter_ weight/ sum of all weights). | Take the max value for this parameter (i.e. full weight) | |

Sample calculation:

| | Parameter 1: # of following (client's parameter value) | Paramater1 score (calculated) (Parameter #1 Score) | Parameter2: # of followers | Parameter2 score (calculated) | Sum of scores |
|---|---|---|---|---|---|
| friend#1 | 23 | 52.9 | 4 | 31.4 | 84.3 |
| friend#2 | 12 | 27.6 | 6 | 47.1 | 74.7 |
| friend#3 | 5 | 11.5 | 2 | 15.7 | 27.2 |
| max values for each parameter (max_parameter) | 23 | | 6 | | |
| weight for each parameter (parameter_weight) | 9 | | 8 | | |
| Sum of all weights (sum of all weights) | (9 + 8) = 17 | | | | |

The initiating entity also enters a last relevant date (e.g. dates of last statuses that were created before this date will get a zero score). The value indicative of the level of importance of the entity is calculated as follows:
For each type of information: find the max value among all the followers of the entity.
For each type of information: If max_parameter !=0 then add to the final score the following expression:
For the last step, multiply the score by 100.
In parameters that are ratios, if the denominator is 0, the ratio equals the numerator.
The final score would be in the range of 0-100%.
Note:
The parameters indicating response to the company's Twitter ™ activity may not be taken into account while calculating the level of influence of the followers of rival companies.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
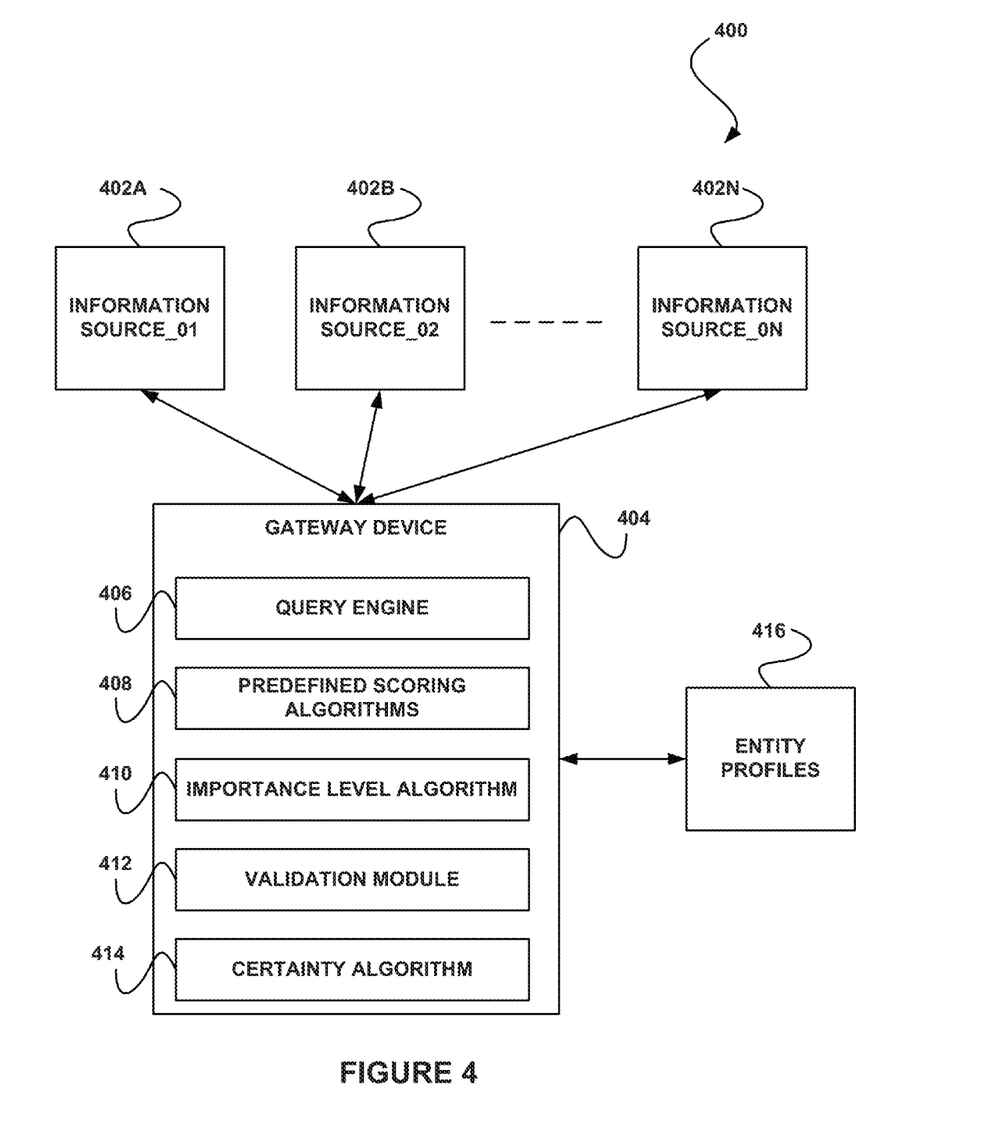
FIG. 4 illustrates a system for determining a level of importance of an entity, in accordance with another embodiment.

FIG. 4 illustrates a system 400 for determining a level of importance of an entity, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, a gateway device 404 is in communication with a plurality of information sources 402A-N. The communication may be provided via a network, such as the Internet. Further, with respect to the present embodiment the information sources 402A-N may each include a different source (located as a device on the network) publishing entity information, and the gateway device 404 may include a device (e.g. computer, etc.) of a service allowing third party entities, such as service providers, content providers, etc. to determine a level of importance of an entity, as described below.

Initially, a query engine 406 of the gateway device 404 identifies an identifier (e.g. name or other profile information) of an entity (e.g. person, etc.). The identifier of the entity may be identified based on input from a user associated with the third party entity (e.g. an administrator, etc.). For example, the user may submit the identifier of the entity to the query engine [e.g. via an application programming interface (API), web service, etc.]. To this end, the gateway device 404 may operate as described below on-demand (e.g. upon initiation by the user). Of course, as another option, the gateway device 404 may operate periodically to perform the functionality described below.

Upon receipt of the identifier of the entity, the query engine 406 searches the information sources 402A-N for the identifier of the entity to determine which of the information sources 402A-N publish information associated with the entity. The information associated with the entity that is published by the determined information sources 402A-N is then identified from such determined information sources 402A-N. For example, the information may include predetermined types of information each associated with at least one of a plurality of predefined scoring algorithms 408.

As an option, each of the predefined scoring algorithms 408 may be associated with a weight, such that only information associated with predefined scoring algorithms 408 with a weight of more than zero may be identified. As another option, each of the predefined scoring algorithms 408 may be associated with a priority, such that the information may be identified in the order of the priority of the associated predefined scoring algorithms 408.

In this way, in response to identification of the information, the predefined scoring algorithms 408 may be applied to the information to generate at least one score, where each score is generated for a different one of the predefined scoring algorithms 408. For example, each predefined scoring algorithm 408 may be applied to the type of information with which it is associated, for generating a score. The score may then be weighted based on the weight associated with the predefined scoring algorithm from which the score was generated. As an option, where the predefined scoring algorithms 408 are prioritized, such predefined scoring algorithms may also be assigned a threshold. Thus, if a score (or weighted score) generated for one of the predefined scoring algorithms 408 does not meet the threshold, the gateway device 404 may terminate operation with respect to the entity for which the identifier thereof was entered and the predefined scoring algorithms 408 with a lower priority than the aforementioned one of the predefined scoring algorithms 408 may be prevented from being utilized to identifying or otherwise scoring the information associated therewith.

Furthermore, an importance level algorithm 410 is applied to the scores generated by the predefined scoring algorithms 408 for calculating a value indicative of level of importance of the entity. For example, the scores may be summed or otherwise utilized in a calculation (either directly or indirectly) to determine the value indicative of level of importance of the entity. In this way, a single indicator of a level of importance of the entity may be generated using the importance level algorithm 410.

Figure 8:
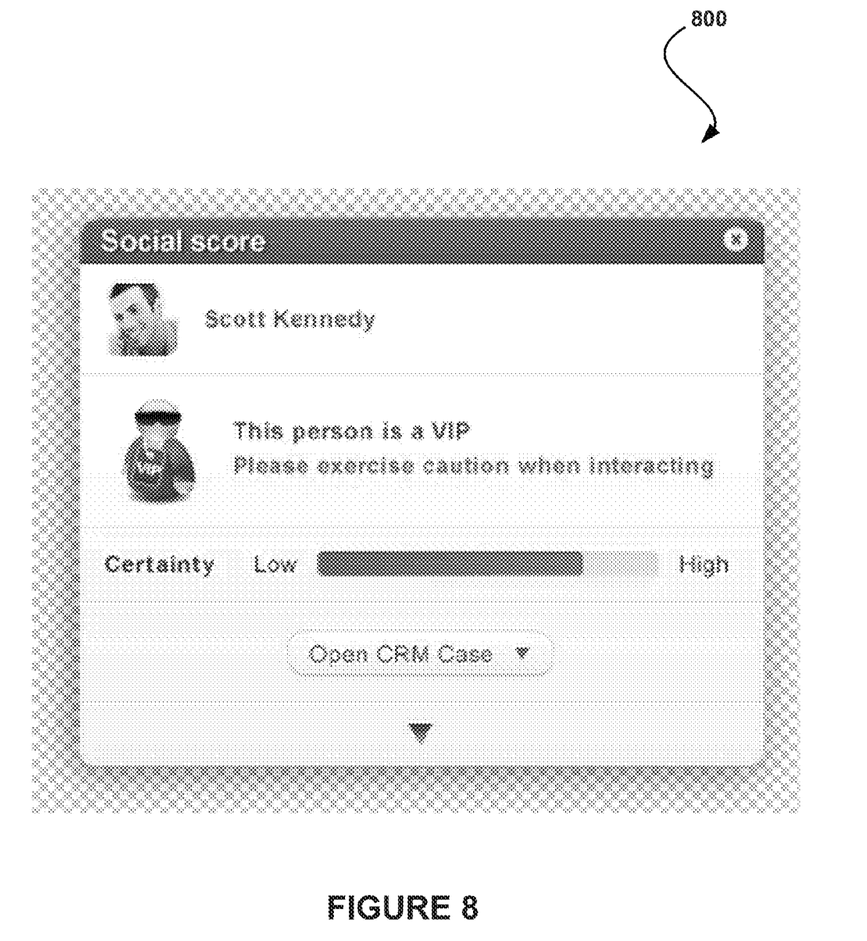
FIG. 8 illustrates a user interface for selecting a value indicative of a level of certainty as a gauge of the level of certainty, in accordance with another embodiment.

As an option, a validation module 412 may validate the information identified using the query engine 406. The validation module 412 may validate whether the information identified using the query engine 406 is in fact associated with the entity. For example, the identifier of the entity utilized to search for the sources publishing information associated with the entity may be associated with other entities for which the sources publish information (e.g. where the identifier is a name, the sources may publish information associated with multiple entities with the same name). It should be noted that the validation may be performed in any desired manner. Just by way of example, the validation may use additional information in a profile of the entity to determine whether the information identified using the query engine 406 is in fact associated with the entity (e.g. by matching information in the profile with information included in the information). Still yet, a certainty algorithm 414 may generate a value indicative of a level of certainty of the value indicative of level of importance of the entity. For example, the level of certainty may be an indicator of the amount of certainty that the level of importance of the entity is an accurate reflection of the importance of the entity. The value indicative of the level of certainty may be selected from one of a plurality of available values indicative of a level of certainty (e.g. "negative" or "positive"), or as a gauge of the level of certainty (e.g. see FIG. 8).

In addition, the certainty algorithm 414 may optionally utilize output from the validation module 412 to generate the value indicative of the level of certainty. For example, if the information identified by the query engine 406 is determined by the validation module 412 to be associated with multiple entities using the same identifier, the value indicative of the level of certainty may indicate that the level of certainty is low (e.g. less than 100%, "negative", etc.). As another example, if the information identified by the query engine 406 is determined by the validation module 412 to be associated with a single entity, the value indicative of the level of certainty may indicate that the level of certainty is high (e.g. 100%, "positive", etc).

As another option, classifications for the entity may be derived from the information identified by the query engine 406 or the content from which such information was identified (e.g. a web page, a description of a Facebook™ group, harvested user profile; user's Twitter™ statuses history, etc.) for identifying specific characteristics of the entity. In one embodiment, an engine of the gateway device 404 performing the classifications may be trainable to determine the classifications to be identified. In various examples, the classifications may include the line of business, whether or not the entity is a celebrity, a type of celebrity, subject matter, relevant tags, etc. that are derived for the entity.

Moreover, the value indicative of the level of importance of the entity, the value indicative of the level of certainty of the value indicative of level of importance, and/or the classifications may be stored by the gateway device 404 in data structure 416 storing entity profiles. For example, the value indicative of the level of importance of the entity, the value indicative of the level of certainty of the value indicative of level of importance, and/or the classifications may be stored in a profile of the entity (e.g. in association with the identifier utilized by the query engine 406 to identify the information associated with the entity).

Figure 5A:
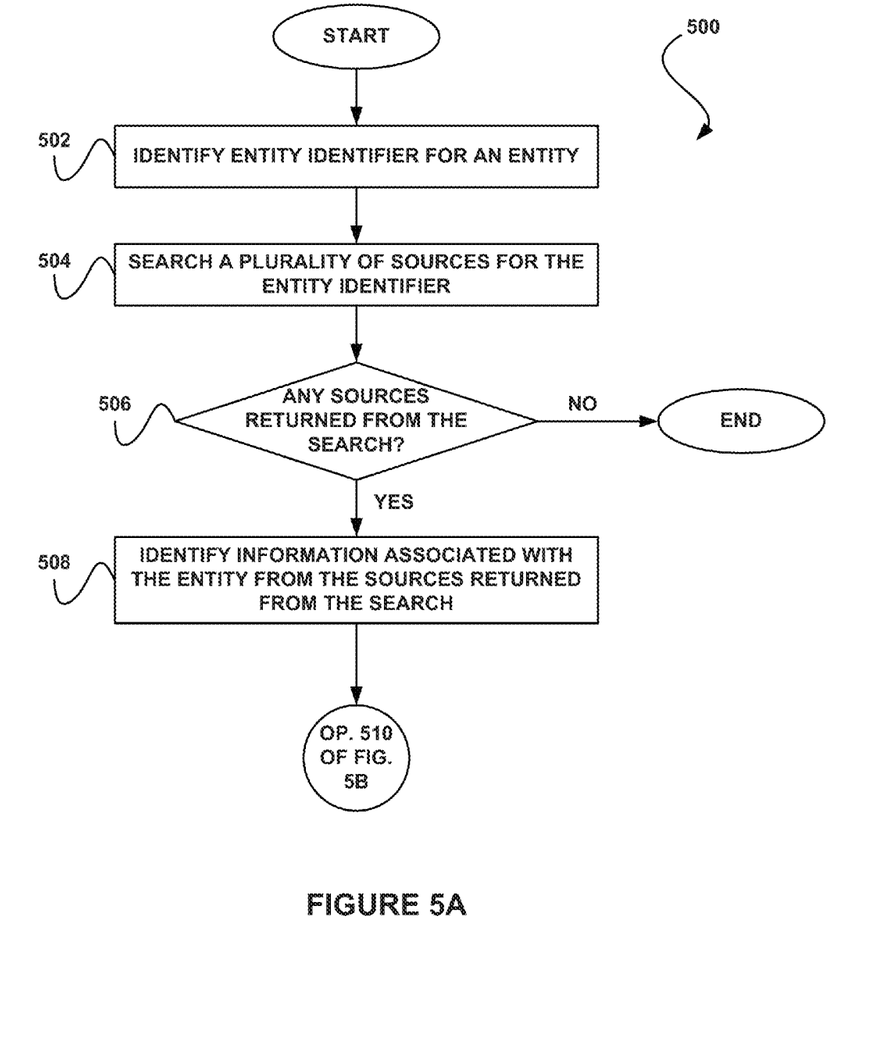
FIGS. 5A-B illustrate a method for calculating a level of importance of an entity and a level of certainty for the level of importance, in accordance with yet another embodiment.
Figure 5B:
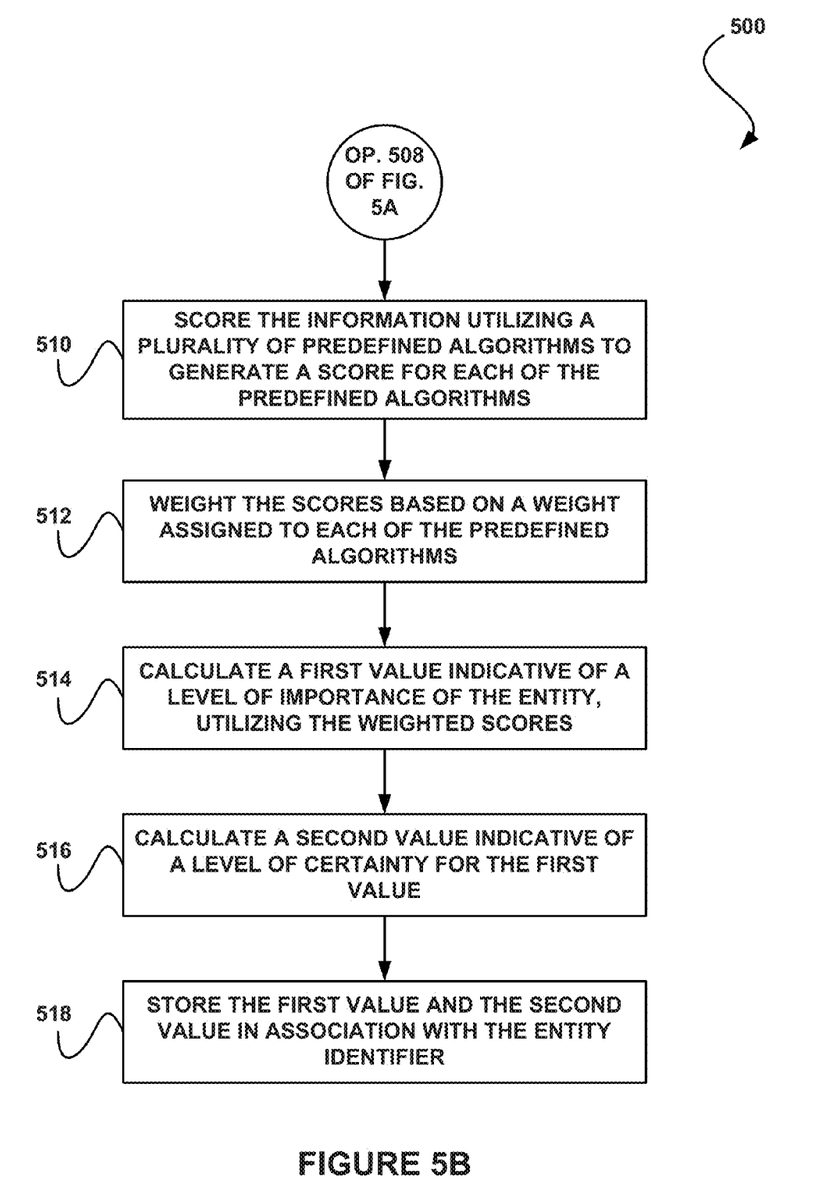

FIGS. 5A-B illustrate a method 500 for calculating a level of importance of an entity and a level of certainty for the level of importance, in accordance with yet another embodiment. As an option, the method 500 may be carried out in the context of the details of FIGS. 1-4. For example, the method 500 may be carried out utilizing the gateway device 404 of FIG. 4. Of course, however, the method 500 may be carried out in any desired environment. Again, the aforementioned definitions may equally apply to the description below.

As shown in operation 502, an entity identifier for an entity is identified. For example, the entity identifier, may include a name of the entity. As another example, the entity identifier may be identified from a profile of the entity.

Additionally, a plurality of sources are searched for the entity identifier, as shown in operation 504. With respect to the present embodiment, the sources may include any sources publishing entity information. Optionally, the sources may be searched via a search engine capable of searching the sources via a single search query.

Further, it is determined whether any sources are returned from the search. Note decision 506. In the present embodiment, sources publishing information associated with the entity identifier, such as the entity identifier itself, may be returned from the search. If it is determined that no sources are returned from the search, the method 500 terminates.

If, however, it is determined that at least one source is returned from the search, information associated with the entity is identified from the source(s) returned from the search. Note operation 508. Moreover, the information is scored utilizing a plurality of predefined algorithms to generate a score for each of the predefined algorithms, as shown in operation 510. For example, each of the predefined algorithms may be associated with a portion of the information (e.g. as determined based on a type of the information), such that the predefined algorithms may be applied to the portion of the information associated therewith to generate a score.

Still yet, the scores are weighted based on a weight assigned to each of the predefined algorithms, as shown in operation 512. Thus, a score generated from a particular predefined algorithm may be weighted according to the weight assigned to such particular predefined algorithm. The weights may optionally be assigned by a third party entity initiating the method 500 for determining a level of importance of the entity for which the entity identifier was searched operation 504.

A first value indicative of a level of importance of the entity is then calculated, utilizing the weighted scores. Note operation 514. For example, the weighted scores may be summed or processed in any other manner utilizing a predetermined algorithm capable of generating the first value indicative of the level of importance of the entity. A second value indicative of a level of certainty for the first value is further calculated, as shown in operation 516. As an option, the second value may be calculated using a validation that results of the search for the entity identifier are associated with the entity (e.g. a validation of the information associated with the entity identified in operation 508). For example, the second value may be a function of the validation.

Furthermore, as shown in operation 518, the first value and the second value are stored in association with the entity identifier. Just by way of example, the first value and the second value may be stored in a profile of the entity that stores the entity identifier (e.g. from which the entity identifier was identified in operation 502). In this way, the first value indicative of the level of importance of the entity and the second value indicative of the level of certainty for the first value may be accessible to the third party entity initiating the method 500 or any other entity capable of using such values (e.g. for determining advertisements, offers, etc. targeted at the entity).

Figure 6:
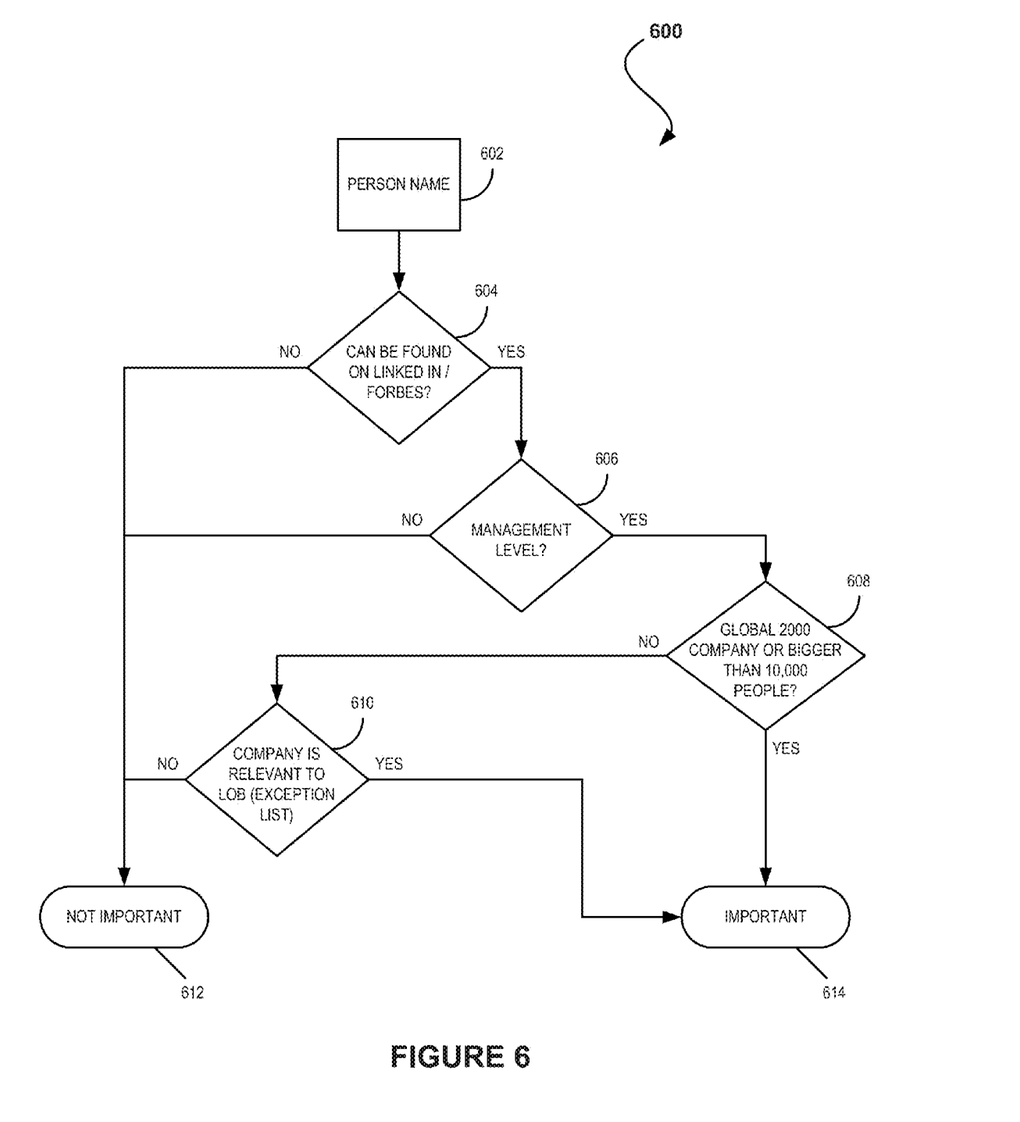
FIG. 6 illustrates a method for determining a level of importance of a person based on professional title of the person, in accordance with another embodiment.

FIG. 6 illustrates a method 600 for determining a level of importance of a person based on professional title of the person, in accordance with another embodiment. For example, the method 600 may be carried out utilizing the gateway device 404 of FIG. 4. As an option, the method 600 may be carried out in the context of the details of FIGS. 1-5. Of course, however, the method 600 may be carried out in any desired environment. Again, the aforementioned definitions may equally apply to the description below.

As shown in operation 602, a person's name is searched. It is then determined whether the person's name is found on LinkedIn™ or Forbes.com, as shown in decision 604. For example, the person's name may be searched using a web search tool of each of LinkedIn™ or Forbes.com. If it is determined that the person's name is not found on either of LinkedIn™ or Forbes.com, the person is determined to not be of importance. Note operation 612.

If, however, it is determined that the person's name is found on either of LinkedIn™ or Forbes.com, it is determined whether the person's business role is a management level role. Note decision 606. For example, information from LinkedIn™ or Forbes.com, in whichever the person's name was found, may be identified which indicates the person's business role. If it is determined that the person's business role is not a management level role, the person is determined to not be of importance. Note operation 612.

If it is determined that the person's business role is a management level role, it is further determined whether the company for which the person holds the management level role is a global 200 company or bigger than 10,000 people. Note decision 608. Again, such determination may be made based on information identified from LinkedIn™ or Forbes.com. If it is determined that the company for which the person holds the management level role is a global 200 company or bigger than 10,000 people, the person is determined to be of importance, as shown in operation 614.

If it is determined that the company for which the person holds the management level role is not either a global 200 company or bigger than 10,000 people, it is determined whether such company is relevant to a line of business of an entity initiating the method 700. The relevancy may be determined using an exception list listing various lines of business that are relevant to the line of business of the entity. If it is determined that the company is relevant to a line of business of the entity, the person is determined to be of importance, as shown in operation 614. If, however, it is determined that the company is not relevant to a line of business of the entity, the person is determined to not be of importance. Note operation 612.

It should be noted with respect to the present method 600 that decisions 606, 608, and 610 may be prioritized predefined algorithms (e.g. such that decision 606 has a highest priority, decision 608 has a next highest priority, etc.) utilized for scoring information associated with the person that is identified in LinkedIn™ or Forbes.com. In addition, the prioritized predefined algorithms for decisions 606 and 608 may also include thresholds, such that if the threshold is not met, the person is automatically determined to not be of importance and the method 600 is terminated. For example, the thresholds may each require that the condition of the associated predefined algorithm be evaluated to "true." It should also be noted that the value indicative of the level of importance of the person (i.e. "not important" or "important" in the present embodiment) are determined based on a score (i.e. evaluated to "true" or "false") of at least some of the decisions 606, 608, and 610, such a single value indicative of the level of importance of the person is determined from the score of at least one predefined algorithm.

Figure 7:
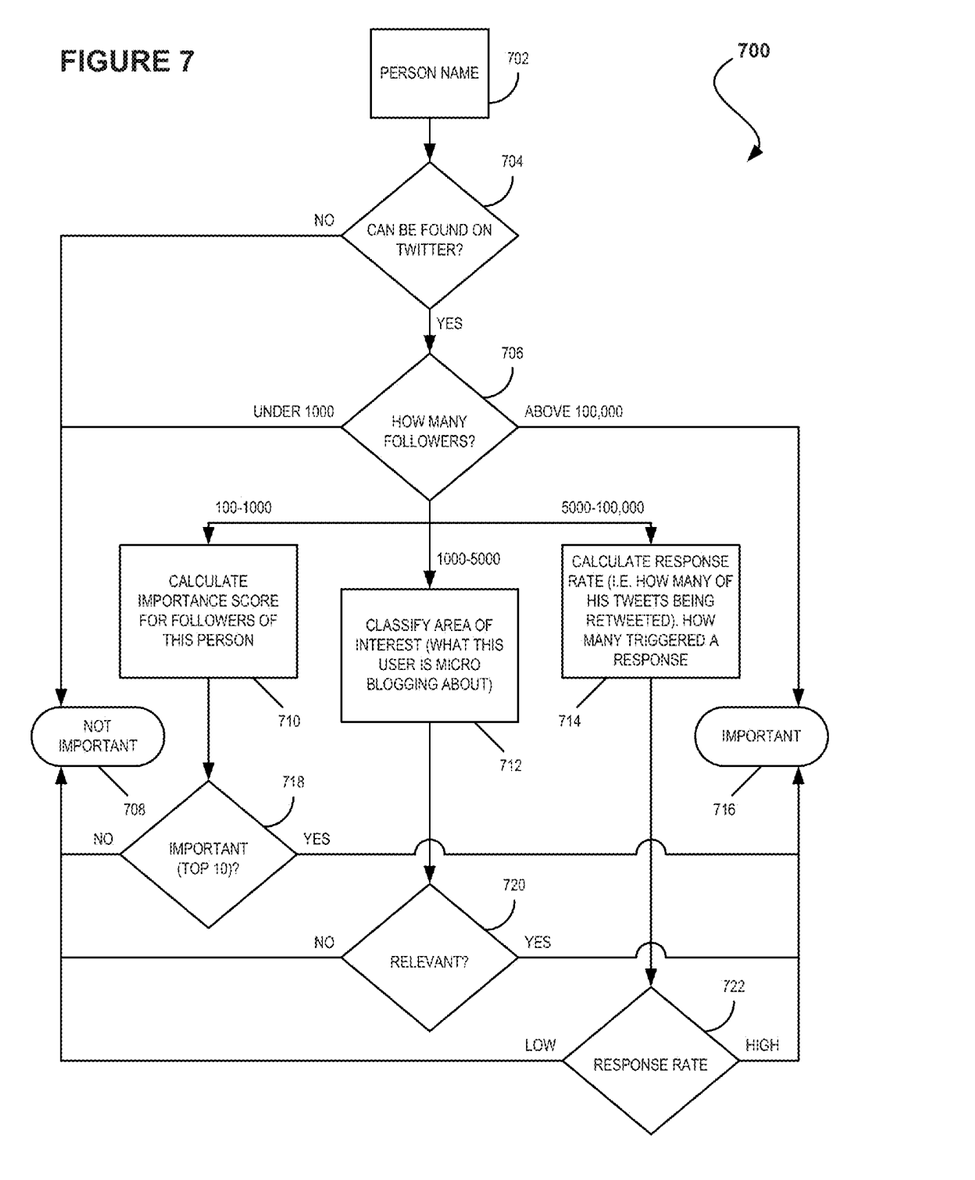
FIG. 7 illustrates a method for determining a level of importance of a person based on a number of connections between the person and other persons as established by a social network service, in accordance with yet another embodiment.

FIG. 7 illustrates a method 700 for determining a level of importance of a person based on a number of connections between the person and other persons as established by a social network service, in accordance with yet another embodiment. For example, the method 700 may be carried out utilizing the gateway device 404 of FIG. 4. As an option, the method 700 may be carried out in the context of the details of FIGS. 1-6. Of course, however, the method 700 may be carried out in any desired environment. Again, the aforementioned definitions may equally apply to the description below.

As shown in operation 702, a person's name is searched. It is then determined whether the person's name is found on Twitter™, as shown in decision 704. For example, the person's name may be searched using a web search tool of Twitter™. If it is determined that the person's name is not found on Twitter™, the person is determined to not be of importance. Note operation 708.

If, however, it is determined that the person's name is found on Twitter™, it a number of followers of the person is identified, as shown in operation 706. For example, information from Twitter™ may be identified which indicates the number of followers of the person. If the number of followers is less than 1,000, the person is determined to not be of importance. Note operation 708.

If the number of followers is more than 100,000, the person is determined to be of importance. Note operation 716. If, however, the number of followers is between 1,000 and 100,000, additional operations are executed. In particular, if the number of followers is between 100 and 1,000, a level of importance for followers of the person is identified. Note operation 710. Again, information from Twitter™ may be identified which indicates the level of importance. It is then determined whether the level of importance meets a threshold (e.g. top 10), as shown in decision 718, such that if the level of importance does not meet the threshold, the person is determined to not be of importance (operation 708), and if the level of importance meets the threshold, the person is determined to be of importance (operation 716).

If the number of followers is between 1,000 and 5,000, an area of interest of the person is classified, as shown in operation 712. Specifically, the subject matter about which the person is micro blogging is identified. Again, information from Twitter™ or another website publishing information associated with the person may indicate the subject matter about which the person is micro blogging. It is then determined whether the subject matter is relevant to an entity that initiated the method 700, as shown in decision 720. If it is determined that the subject matter is not relevant, the person is determined to not be of importance (operation 708), and if it is determined that the subject matter is relevant, the person is determined to be of importance (operation 716).

Still yet, if the number of followers is between 5,000 and 100,000, a response rate associated with the person is calculated. Note operation 714. In particular, the response rate may include a number of tweets published by the person that are re-twitted (republished via Twitter™ by other persons. It is then determined whether the response rate meets a predetermined threshold, as shown in operation 722. If it is determined that the response rate meets a predetermined threshold ("high"), the person is determined to be of importance (operation 716). However, if it is determined that the response rate does not meet a predetermined threshold ("low"), the person is determined to not be of importance (operation 708).

It should be noted with respect to the present method 700 that decisions 704, 706, etc. may be prioritized predefined algorithms (e.g. such that decision 704 has a highest priority, decision 706 has a next highest priority, etc.) utilized for scoring information associated with the person that is identified in Twitter™. In addition, the prioritized predefined algorithms for decisions 704 and 706 may also include thresholds, such that if the threshold is not met, the person is automatically determined to not be of importance and the method 700 is terminated. It should also be noted that the value indicative of the level of importance of the person (i.e. "not important" or "important" in the present embodiment) are determined based on a score (i.e. evaluated to "true" or "false") of at least some of the decisions (e.g. 718, 720, etc.), such that a single value indicative of the level of importance of the person is determined from the score of at least one predefined algorithm.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program which when executed by a processor cause the processor to perform a method comprising:
    identifying an identifier of an entity from a profile of the entity stored by a first source in communication with a third party entity;
    searching, by the third party entity, at least one second source that publishes information, where the at least one second source is searched for the identifier of the entity to determine which of the at least one second source publishes information associated with the entity, wherein the third party entity and the at least one second source are in communication via a network, and the at least one second source publishes information by making the information available to the third party entity over the network, and further wherein the third party entity searches the at least one second source by submitting a query over the network for the identifier of the entity;
    for each of the at least one second source determined to publish the information associated with the entity:
        identifying via the network the information associated with the entity from the second source publishing the information associated with the entity;
        scoring the information utilizing at least one predefined algorithm to generate at least one score, each score generated for a different one of the at least one predefined algorithm;
        weighting each of the at least one score based on a weight assigned to one of the at least one predefined algorithms utilized to generate the at least one score, for generating at least one weighted score;
        calculating a value indicative of a level of importance of the entity, utilizing the at least one score; and
        calculating another value indicative of a level of certainty for the value indicative of the level of importance;
    wherein the at least one second source publishing information is searched for the identifier by querying the at least one second source publishing information for the identifier, such that the at least one second source publishing information associated with the entity is determined from a result of the query;
    wherein a search engine separate from the at least one second source is utilized to perform the search for searching all of the at least one second sources publishing information via a single search.

2. The non-transitory computer readable medium of claim 1, wherein the entity includes a person.

3. The non-transitory computer readable medium of claim 1, wherein the identifier of the entity includes a name of the entity.

4. The non-transitory computer readable medium of claim 1, wherein the at least one second source that publishes entity information includes a website.

5. The non-transitory computer readable medium of claim 1, wherein the website provides a social networking service.

6. The non-transitory computer readable medium of claim 1, wherein the information associated with the entity includes a rate of activity of the entity.

7. The non-transitory computer readable medium of claim 1, wherein the information associated with the entity includes a number of other entities to which the entity has a connection established via a social network service provided by one of the at least one second source publishing information associated with the entity.

8. The non-transitory computer readable medium of claim 1, wherein the information associated with the entity includes an indication of whether the entity is a celebrity.

9. The non-transitory computer readable medium of claim 1, wherein the information associated with the entity includes a number of tags associated with the entity.

10. The non-transitory computer readable medium of claim 1, wherein each one of a plurality of predefined algorithms is utilized to score a different type of information associated with the entity that is identified from the at least one second source publishing the information associated with the entity.

11. The non-transitory computer readable medium of claim 1, wherein the value indicative of the level of importance of the entity is calculated utilizing the at least one weighted score.

12. The non-transitory computer readable medium of claim 1, wherein the other value indicative of the level of certainty for the value indicative of the level of importance is calculated using a validation.

13. The non-transitory computer readable medium of claim 12, wherein the validation includes validating that results of the search for the identifier are associated with the entity.

14. The non-transitory computer readable medium of claim 1, further comprising storing the value indicative of the level of importance in association with the identifier of the entity.

15. The non-transitory computer readable medium of claim 1, wherein further a search tool provided by the at least one second source publishing entity information is utilized to search for the identifier of the entity.

16. The non-transitory computer readable medium of claim 1, wherein the information includes a plurality of information types, and the at least one algorithm includes a plurality of algorithms, where each information type is associated with one or more of the plurality of algorithms.

17. A method, comprising:
   identifying an identifier of an entity from a profile of the entity stored by a first source in communication with a third party entity;
   searching, by the third party entity, at least one second source that publishes information, where the at least one second source is searched for the identifier of the entity to determine which of the at least one second source publishes information associated with the entity, wherein the third party entity and the at least one second source are in communication via a network, and the at least one second source publishes information by making the information available to the third party entity over the network, and further wherein the third party entity searches the at least one second source by submitting a query over the network for the identifier of the entity;
   for each of the at least one second source determined to publish the information associated with the entity:
      identifying via the network the information associated with the entity from the second source publishing the information associated with the entity;
      scoring the information utilizing at least one predefined algorithm to generate at least one score, each score generated for a different one of the at least one predefined algorithm, utilizing a processor;
      weighting each of the at least one score based on a weight assigned to one of the at least one predefined algorithms utilized to generate the at least one score, for generating at least one weighted score;
      calculating a value indicative of a level of importance of the entity, utilizing the at least one score; and
      calculating another value indicative of a level of certainty for the value indicative of the level of importance;
   wherein the at least one second source publishing information is searched for the identifier by querying the at least one second source publishing information for the identifier, such that the at least one second source publishing information associated with the entity is determined from a result of the query;
   wherein a search engine separate from the at least one second source is utilized to perform the search for searching all of the at least one second sources publishing information via a single search.

18. A system, comprising:
   a processor is coupled to memory via a bus for:
   identifying an identifier of an entity from a profile of the entity stored by a first source in communication with a third party entity;
   searching, by the third party entity, at least one second source that publishes information, where the at least one second source is searched for the identifier of the entity to determine which of the at least one second source publishes information associated with the entity, wherein the third party entity and the at least one second source are in communication via a network, and the at least one second source publishes information by making the information available to the third party entity over the network, and further wherein the third party entity searches the at least one second source by submitting a query over the network for the identifier of the entity;
   for each of the at least one second source determined to publish the information associated with the entity:
      identifying via the network the information associated with the entity from the second source publishing the information associated with the entity;
      scoring the information utilizing at least one predefined algorithm to generate at least one score, each score generated for a different one of the at least one predefined algorithm;
      weighting each of the at least one score based on a weight assigned to one of the at least one predefined algorithms utilized to generate the at least one score, for generating at least one weighted score;
      calculating a value indicative of a level of importance of the entity, utilizing the at least one score; and
      calculating another value indicative of a level of certainty for the value indicative of the level of importance;
   wherein the at least one second source publishing information is searched for the identifier by querying the at least one second source publishing information for the identifier, such that the at least one second source publishing information associated with the entity is determined from a result of the query;
   wherein a search engine separate from the at least one second source is utilized to perform the search for searching all of the at least one second sources publishing information via a single search.

* * * * *